United States Patent
Gievers

[11] 3,841,758
[45] Oct. 15, 1974

[54] ROTATION SENSITIVE RETARDER

[76] Inventor: John George Gievers, 245 Wimpole Dr., Rochester, Mich. 48063

[22] Filed: Sept. 28, 1972

[21] Appl. No.: 292,962

[52] U.S. Cl. ............ 356/106 LR, 350/147, 350/157
[51] Int. Cl. ............................ G01b 9/02, G02f 1/24
[58] Field of Search ....... 356/106 LR; 350/157, 147

[56] References Cited
UNITED STATES PATENTS

| | | | |
|---|---|---|---|
| 3,467,472 | 9/1969 | Killpatrick | 356/106 LR |
| 3,486,130 | 12/1969 | Macek | 356/106 LR |
| 3,642,373 | 2/1972 | Catherin | 356/106 LR |
| 3,692,385 | 9/1972 | Gievers | 350/157 |

*Primary Examiner*—Ronald L. Wibert
*Assistant Examiner*—V. P. McGraw
*Attorney, Agent, or Firm*—Barnes, Kisselle, Raisch & Choate

[57] ABSTRACT

A rotation sensitive retarder system comprising an optical loop around which two linear polarized lightbeams are guided in opposite directions. A splitting and reunifying device is utilized in the optical loop for producing two linear polarized orthogonal components and reunifying the components. Rotation in inertial space produces polarization-form conversion in the reunified beam which then is analyzed to determine the extent of the rotation. A second splitting and reunifying device is provided in combination with the first such that the transmission axes of both are rotated 45° to each other. The second splitting device has a dual purpose, splitting the signal light from the light oscillating in the original plane of the light source light and functioning at the same time as the polarization-form analyzer. The splitting and reunifying device comprises a construction that produces very high efficience. The source of light preferably comprises a laser which is positioned in a manner and the system is provided with means to obviate lock-in, null drift, and results in a very high accuracy at small input rates.

27 Claims, 13 Drawing Figures

PATENTED OCT 15 1974

ROTATION SENSITIVE RETARDER

This invention is an improvement on my application Ser. No. 41,849 filed June 1, 1970, titled Rotation Sensitive Retarder System issued as Pat. No. 3,682,385 dated Sept. 19, 1970.

BACKGROUND OF INVENTION

In my co-pending patent application Ser. No. 41,849, there is disclosed and claimed a rotation sensitive retarder system comprising an optical loop around which two orthogonal linear polarized light beams are guided in opposite directions. A splitting and reunifying device is utilized in the optical loop for producing two orthogonal components and reunifying the components. Rotation in inertial space produces polarization-form conversion in the reunified beam which then is analyzed to determine the extent of the rotation. A second splitting and reunifying device placed in the combined beam emerging from the optical loop splits the signal light from the light oscillating in the original plane and deflects it in direction to the analyzer and sensor.

Among the objects of the invention is to provide a system of the above described type which has improved light efficiency.

It is well known that the accuracy of the conventional beat frequency ring laser gyro could be orders of magnitude better than required for the needs of guidance and navigation if the fundamental noise process of spontaneous emission alone would limit its accuracy. The accuracy of a laser gyro operating at this fundamental theoretical limit would by far exceed drift rates of $10^{-4}$ degree per hour. If these fundamental accuracies could be realized, the laser gyro would be far superior to any mass gyro in operation today with respect to accuracy as well as low cost.

Unfortunately significant problems have been encountered with the beat frequency laser gyro which must be considered as the practical limit of accuracy, namely, lock-in and null drift, caused by the Fizeau effect. These factors produce errors many orders of magnitude above what an inertial navigation system should measure.

The lock-in phenomena prevents the laser gyro from accurately measuring low input rates. It arises from the coupling of energy between the two modes of oscillation in the gain medium and results in a characteristic input, output relationship, whereby the frequency difference is none existant below some rate threshold. As the input rate is reduced, the frequency difference between the two oscillators will fall to zero before the input rate goes to zero.

The input rate at which the drop to zero difference frequency occurs in the conventional helium neon ring laser is many orders of magnitude above the accuracy an inertial navigation system should have, typically in order of 100° per hour for a ring laser of about $0.1m^2$ enclosed area.

To avoid this large threshold caused by lock-in, certain mechanical and optical techniques of biasing to move the operating point of the ring laser gyro away from the very low rate to much higher input rates, where the operation approaches the ideal, have been developed. But because of the large magnitude of the threshold involved, the problem remains very significant and reduction of the lock-in error to values smaller than 0.1° per hour is difficult to achieve.

A second significant error source with the beat frequency ring laser gyro is null drift caused by the Fizeau effect. Stability, spectral purity and efficiency requirements have dictated the use of a gas laser excited by direct current. The standard choice of the gain medium is helium neon. But if gas discharge is sustained with direct current the gas flows in the discharge cavity from the anode to the cathode and back. Thus the light waves travelling through the tube in opposite directions experience different cavity lengths caused by the Fizeau effect. The results are different oscillating frequencies. The gas flow can produce apparent drift rates of hundreds of degrees per hour if not balanced in the two directions. This constitutes an additional compensation problem of considerable magnitude. Again the problem has been solved only to some degree by making use of two geometrically symmetrical discharge tubes or by balancing the effect of the gas flow by other means.

The rotation sensitive retarder laser embodying the invention produces an output signal the intensity of which is the function of the input rate, in place of beat frequency in the conventional ring laser and the oscillating frequency of both laser cavities remains constant, irrespective of input rate. As a result the lock-in problem is eliminated.

Additionally the new laser gyro lends itself easily to the absolute elimination of the null drift, by having the light component travel through the gain medium in the same direction on identical paths, in contrast to the beat frequency laser where they have to travel through the gain medium in opposite directions.

In this way the system of the invention is most accurate at small input rates, i.e., in the range where highest sensitivity is most important.

Further objects of the invention are to provide modulation methods and the analyzing of the polarization-form conversion; specially designed for the system mechanical and electrical rebalance methods to obtain the drift angle, which is the time integral of the angular rate; analog and digital feedback arrangements and to eliminate light losses in the optical loop caused by reflection on the surfaces of optical elements in the light path.

BRIEF DESCRIPTION OF DRAWINGS.

The features of the invention become better understood by the following description in conjunction with the accompanying drawings.

GENERAL DESCRIPTION

Figure 2:
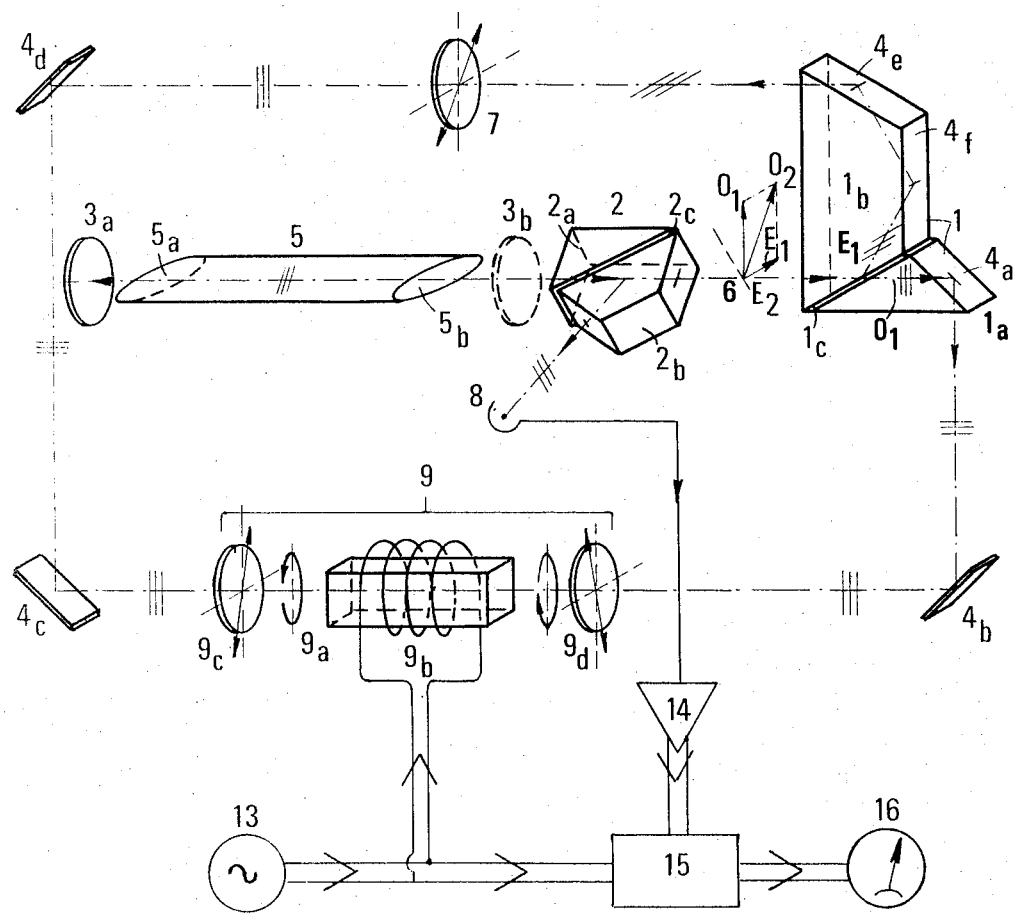
FIG. 2 is a diagrammatic perspective view of the rotation sensitive retarder system embodying the invention equipped with the highly efficient polarizing beamsplitter, a Faraday modulator in the optical loop and an external light source.

Referring to FIG. 2, the rotation sensitive retarder embodying the invention is shown as comprising a gas laser 5 which directs light to a splitting and reunifying device 1, refered to in the following as polarizing beamsplitter, positioned and forming a part of an optical loop. The remaining part of the optical loop being formed by mirrors 4b,4c,4d.

A second polarizing beamsplitter 2, the transmission axis of which is rotated 45° with respect to that of the first polarizing beamsplitter 1 separates the signal from the reunified beam emerging from the optical loop.

DETAILED DESCRIPTION

Polarizing Beamsplitter

A most vital component of the rotation sensitive retarder system, hereinafter refered to as R.S.R. system, embodying the invention, is a polarizing beamsplitter used as splitting and reunifying device in the optical loop and as splitting device for separating the signal from the original light beam. Therefore, before the R.S.R. system as such can be explained in detail, a brief description of the beamsplitter is necessary.

To obtain a R.S.R. system having maximum efficiency, the polarizing beamsplitter which, in essence, is nothing but a linear polarizer producing both orthogonal light components should have an efficiency of 100 percent, i.e., both components should be polarized 100 percent in their proper planes, each containing half of the incident light. The Glan-Foucault polarizer explained in detail in the aforementioned patent application Ser. No. 48,849 is a reflecting polarizer equipped with an airgap between two triangular shaped prisms consisting of calcite or sodium nitrate ($NaNO_3$). This beamsplitter is not 100 percent efficient and does not completely meet the requirements mentioned above.

Figure 1A:
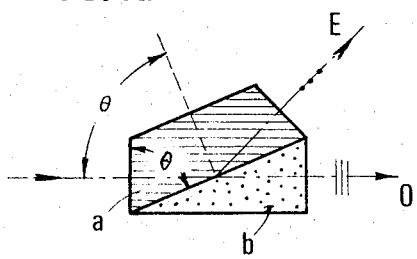
FIGS. 1 a and 1 b are schematics of a highly efficient polarizing beamsplitter most compatible with the system embodying the invention.
Figure 1B:
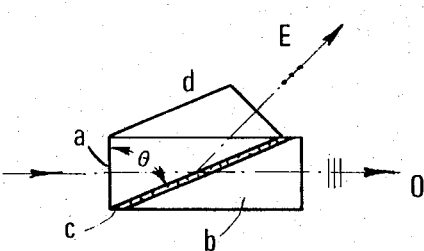

More efficient polarizers which are more compatible and which are employed in the optical circuit of this invention are shown in FIG. 1a and FIG. 1b.

The beamsplitter in FIG. 1a consists of two prisms $a$ and $b$, composed of birefringent material like calcite or $NaNO_3$. The optic axes are oriented in directions indicated by the lines and dots. The triangular shaped prisms $a$ and $b$ are in direct optical contact with each other at their diagonal planes.

In the beamsplitter of FIG. 1b, similar shaped prisms $a$ and $b$ consisting, however, of an isotropic material like glass are used. They are separated by a thin plate of calcite or $NaNO_3$. The refractive index $n_{G1}$ of the glass is chosen to be equal to the refractive index $n_0$ of the ordinary ray of the birefringent material of the thin plate $c$, ($n_{G1}=n_0$). The optic axis in the thin plate $c$ is oriented parallel to the plate surface and the plate is installed in such a way between the two prisms $a$ and $b$, that the optic axis lies parallel to the apex line of the triangular shaped prism, i.e., vertical to the plane of the paper in FIG. 1b, as indicated by dots.

Again the plate $c$ is connected with the prism $a$ and $b$ either by direct optical contact or with an optical cement which has an index of refraction equal to the index $n_0$ of the birefringent material of the plate $c$. Such cement is commercially available. Calcite and $NaNO_3$ are negative birefringent materials the refractive index $n_0$ of the ordinary ray O of which is larger than the index $n_E$ of the extraordinary ray E.

If the apex angle $\theta$ in the prisms $a$ and $b$ of FIG. 1a and 1b are chosen larger than the critical angle $\phi_{CE}$ of total reflection of the E ray which is found as:

$$\sin\phi_{CE}=n_E/n_0 \qquad (1)$$

then the E ray will be totally reflected at the diagonal surface of the prism $b$ in FIG. 1a or the surface of the thin plate $c$ in the beamsplitter of FIG. 1b. The critical angle with calcite is: $\phi_{CE} = 63°$ and with sodium nitrate $\phi_{CE}=57°\ 40'$.

The O ray, however is transmitted straight through because it meets on its way through the beamsplitter always an equally large optical density, i.e. always the same refractive index $n_0$. The planes of oscillation of the O and the E ray are indicated in FIG. 1a and FIG. 1b by three short bars across the beam direction or by three dots respectively.

To avoid total reflection of the E ray at the upper internal surface of prism $a$ an additional prism $d$ can be added. Prism $a$ and $d$ can be formed out of one single piece instead of being optically cemented together. The shape of the prism $a$ as well as that of $b$ can be modified according to the desired direction of emergence of the respective light component as is the case with the beam-splitter 1 in FIG. 2.

There are, of course modifications of the described polarizing beamsplitter feasible. The optic axis in the thin separating plate could be oriented perpendicular to the direction of the ordinary ray O and perpendicular to the apex line of the prisms. The two glass prisms could be replaced also by prisms composed of the same birefringent material as the plate, whereby the optic axis in the prisms is oriented parallel to the direction of the O ray. This latter modification avoids the effect of strain present in isotropic materials like glass.

Principally it is feasible to use in the R.S.R. system also other types of polarizers, like the Glan-Foucault polarizer. The optical circuits embodying the invention function however best, with a more efficient and compatible polarizing beamsplitter.

The Rotation Sensitive Retarder System

A basic objective of the rotation sensitive retarder system embodying the invention is achievement of a large output signal, which is little affected by noise, with a limited amount of light energy available from the light source whereby the size of the total system should be small. With the R.S.R. system this is achieved by a large intensity of the output signal produced by conversion of the initially incident polarized light from the light source at a small input rate. To obtain the highest possible light efficiency, light losses caused by scattering, by partial reflection at surfaces of the optical components in the light path, and the noise in the output signal should be small.

Optimum use of the initial light energy can be made in the conventional ring laser which utilizes the optical loop as resonance cavity. Unfortunately in prior art systems significant problems caused by lock-in and null drift, resulting from gas flow in the gain medium, have been encountered which reduce the theoretically obtainable accuracy, as discussed above.

The R.S.R. system embodying the invention can be operated in a similar manner as the conventional ring laser, by utilizing the optical loop as resonance cavity. This R.S.R. system is, however, different in its operation since lock-in as well as null drift are readily eliminated, as hereinafter described.

To utilize the optical loop of the R.S.R. as resonance cavity certain conditions have to be met. In order to delineate these conditions we start the description of the R.S.R. laser system with the explanation of an normal R.S.R. system equipped with an independent light source, similar to that discussed already in the initial patent.

The R.S.R. system shown in FIG. 2 is equipped, in contrast to the system of the aforementioned patent application Ser. No. 41,849 with the highly efficient beamsplitters 1 and 2, discussed in the preceding paragraph, the Faraday cell 9 in the loop for modulation purposes, as presently discussed, and a gas laser light source 5.

The gas laser, mounted outside the loop, consists of the discharge tube 5 and the two endmirrors 3a and 3b. The endmirror 3b is only partially reflecting. A certain amount of the light, less than 1 percent, as is normal with conventional gas lasers, is transmitted. The discharge tube 5 is equipped with the Brewster window 5a and 5b. This results in linear polarization of the emitted light. The discharge tube 5 is oriented such that the plane of the emitted light oscillations has an azimuth angle of 45°, as indicated by the three bars across the light beam direction in FIG. 2.

The light polarized in this way can pass unobstructed through the beamsplitter 2 because it oscillates parallel to the transmission axis of its ordinary ray $O_2$. The beamsplitter 2 consists of the two glass prisms 2a and 2b, which are separated by the thin birefringent plate 2c.

But the transmission axis of the beamsplitter 1 which consists of the two glass prisms 1a and 1b, separated by the birefringent plate 1c, is rotated at an angle 45° with respect to the transmission axis of beamsplitter 2 and the ray $O_2$, as shown in FIG. 2. As a result beamsplitter 1 splits the incident ray $O_2$ in the two orthogonal components, the ordinary ray $O_1$ and the extraordinary ray $E_1$. The planes of oscillations of the orthogonal ray $O_1$ and $E_1$ are shown in FIG. 2 by the vector diagram 6, and are marked additionally by the cross bars on the light beams traveling in opposite directions around the loop.

The optical loop is realized by the internal reflection at the surface 4a in the glass prism 1a, the corner mirrors 4b, 4c and 4d and the internal reflection at the surfaces 4e and 4f of the glass prism 1b of beamsplitter 1. In the light path of the loop additionally the half wave plate 7 and the Faraday cell 9 are inserted.

The half wave plate 7 the optic axis of which is shown by the double headed arrow exchanges the planes of oscillations of the countercirculating light beams in order to render feasible reunification by beamsplitter 1. The recombined light emerging from beamsplitter 1 oscillates again in the original plane of the ordinary ray $O_2$ of beam-splitter 2. Because of this reason, it is transmitted through beamsplitter 2 unobstructed and will be incident on the endmirror 3b which reflects most of it in the direction it came from.

If the R.S.R. system is exposed to an angular rate $\omega_0$ in inertial space, a difference in path length of the countercirculating beams in the loop results. The path length of the light traveling in direction of rotation of the system is lengthened, and the path of the light traveling opposite is shortened. The difference in path lengths causes a phase shift $\delta$ between the two emerging light components $O_1$ and $E_1$ of:

$$\delta = (8\pi A/\lambda c)\omega_0 \quad (2)$$

where $A$ is the enclosed area of the loop, $\lambda$ the wave length of the light and $c$ the speed of light.

Figure 4:
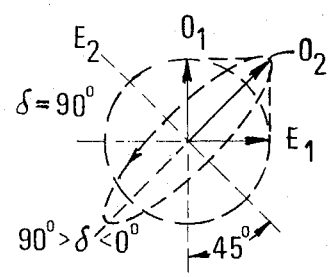
FIG. 4 is a diagram of the light vectors emerging from the polarizing beamsplitter in the optical loop.

As a result of the phase angle $\delta$ the emerging light components $O_1$ and $E_1$ can not be recombined any more to linear polarized light as in the case of zero input rate, but forms elliptical polarized light. The ellipticity will increase with the input rate $\omega_0$. In the extreme case circular polarized light will emerge from beamsplitter 1. The beamsplitter 2, however, permits only linear polarized light oscillating in the plane of its $O_2$ ray to be transmitted. But elliptical and circular polarized light, as can be realized from the vector diagram shown in FIG. 4, which illustrates the light vectors emerging from beamsplitter 1, contains a light vector oscillating in the plane orthogonal to $Q_2$, i.e., the plane of the extraordinary ray $E_2$ of beam-splitter 2. This light $E_2$ is not transmitted but totally reflected at the thin plate 2c of beamsplitter 2, and falls on the photodetector 8.

The light incident on photodetector 8 induces a photocurrent $i_p$, which is amplified in preamplifier 14 and and fed into the rectifier 15. The function of the retifier 15, the output of which is indicated by the instrument 16 will be explained in detail later. The alternator 13 supplies the electric power.

The light vector $E_2$ arriving at photosensor 8 increases with the angular rate $\omega_0$. The amplitude of $E_2$ is:

$$E_2 \approx B_T \sin \delta \quad (3a)$$

or with the small phase angle $\delta$, to be of interest only in connection with the R.S.R.:

$$E_2 \approx B_T \delta \quad (3b)$$

where $B_T$ represents the amplitude of the total combined light emerging from beamsplitter 1.

The photocurrent $i_p$, however, is not proportional to the amplitude of the light vector $E_2$ but proportional to the light intensity which is the square of the amplitude.

Hence, the photocurrent $i_p$ generated by the phase angle amounts to:

$$i_p = K B_T^2 \delta^2 \qquad (4)$$

where $K$ represents a constant, defined by the characteristics of the photosensor, etc. and where $B_T^2$ is the light intensity of the total combined light emerging from beamsplitter 1.

The equation shows, that the photocurrent $i_p$, increases with the light intensity emitted by the light source and the square of the phase shift $\delta$. Since $\delta$, according to equation 2 increases proportional with the angular rate $\omega_o$, the photocurrent $i_p$ increases with the square of the input rate as well.

Multiple Light Circulation

In the ring interferometer most of the light energy, after traveling around the loop once, is discarded. In the ring laser, in contrast, the light travels many times around the loop which increases the total light intensity in the loop considerably. This is the main reason for the high accuracy of a ring laser of small size, if lock-in is disregarded.

In the R.S.R. system shown in FIG. 2 the light can be made to travel several times around the loop also. Most of the light emerging from beamsplitter 2 and incident on the endmirror 3b is reflected and returns a second time to the loop and so on. This reflected light can be superimposed on the initial light emitted from the laser 5.

How often the light will travel around the loop and how much this way the total light intensity $B_T^2$ will be increased depends on the light losses suffered on each trip of the light around the loop. With each trip the initial intensity $B_0^2$ of the light is reduced by a certain constant factor $\eta$. This results in the final total intensity $B_T^2$ which is the sum of a geometrical series, the elements of which are steadily decreasing by the factor $\eta$. The sum of all the elements in the series is found to:

$$B_T^2 = B_0^2 [(1 - n\eta)/(1 - n)]$$

Since $\eta$ is always smaller than one, $\eta^- = 0$.
This way we find for the total final light intensity $B_T^2$:

$$B_T^2 = B_0^2 / 1 - \eta \qquad (5)$$

If the value $B_T^2$ of equation 5 is inserted in equation 4 the photocurrent $i_p$ is found to:

$$i_p = K/(1 - \eta) B_0^2 \delta^2 \qquad (6)$$

or by taking into consideration equation 2 to:

$$i_p = [K/(1 - \eta)](64\pi^2 A^2/\lambda^2 C^2) B_0^2 \omega_o^2 \qquad (7)$$

If we assume, as an example, 10 percent loss of light per round trip which results in a factor $\eta = 0.9$, then according to equation 5 and 7 the photocurrent $i_p$, at a certain input rate $\omega_o$, will be 10 times larger than without the multiple light circulation. In case the light loss can be reduced to 1 percent per round trip, the signal will be increased by a factor of 100.

The smallest theoretically feasible reduction of the light losses is determined by the light energy required for the signal. This energy, released to photosensor 8, is very small. As shown later, with compensated systems, the maximal phase angle $\delta$ will remain always much smaller than 1 sec. of arc. or $0.5 \times 10^{-5}$ radian. Thence the factor $\eta$ could be larger than $\eta = 1 - 0.5^2 \times 10^{-10}$ and according to equation 7 the photocurrent $i_p$ could be increased by a factor of more than $1/(1 - \eta) = 1/(0.25 \times 10^{-10}) = 4 \times 10^{+10}$ It can be shown with equation 7 that this gain factor renders theoretically feasible measurement of an input rate $\omega_o$ of $1.5 \times 10^{-8}$ o/h with an R.S.R. system having a loop area not exceeding 100 cm² (4×4 in.). This is many orders of magnitude more accurate than required for any guidance and navigation system. The only requirement to reach this goal is sufficient reduction of the light losses in the optical circuit. How this reduction can be accomplished with the R.S.R. system is more fully described below.

The R.S.R. laser System

In considering increased accuracy by multiple beam circulation the implied assumption had been made above, that the light circulating in the optical loop is incoherent. This, however, is not quite correct if the gas laser as in FIG. 2, is employed as the light source. In this case we have to assume coherent light and additional factors must be taken into consideration. The light reflected from mirror 3b after traveling once around the loop, will not necessarily increase the light intensity of the combined beam. Depending on the relative phase angle between the two superimposed beams, the final intensity can be even reduced. If the relative phase angle is 180° the two beams cancel each other.

The relative phase angle between the two superimposed beams depends on the path length of the light traveling from mirror 3b around the loop and back. This length should be a whole integer multiple of the wave length to achieve increased intensity. Mirror 3b, therefore, must be carefully adjusted. Then, if the adjustment is correct, mirror 3b is located exactly at a node of the light oscillation and both path lengths on either side of mirror 3b are integer multiples of the wave length. This shows, that the same rules for the path length outside the mirror 3b prevail as for the laser cavity itself. The path around the loop thus becomes a part of the laser cavity.

Under these circumstances the mirror 3b can be removed entirely and the total light path including the optical loop utilized as laser cavity. This simplifies the calibration considerably. Only the mirror 3a need be adjusted until the entire light path starting at mirror 3a, around the loop and back, is an integer multiple of the wave length.

Under this condition the discharge tube 5 can be placed, of course, at any point of the laser cavity. It can also be located inside the loop as is the case in the optical loop of FIG. 3.

Figure 3:
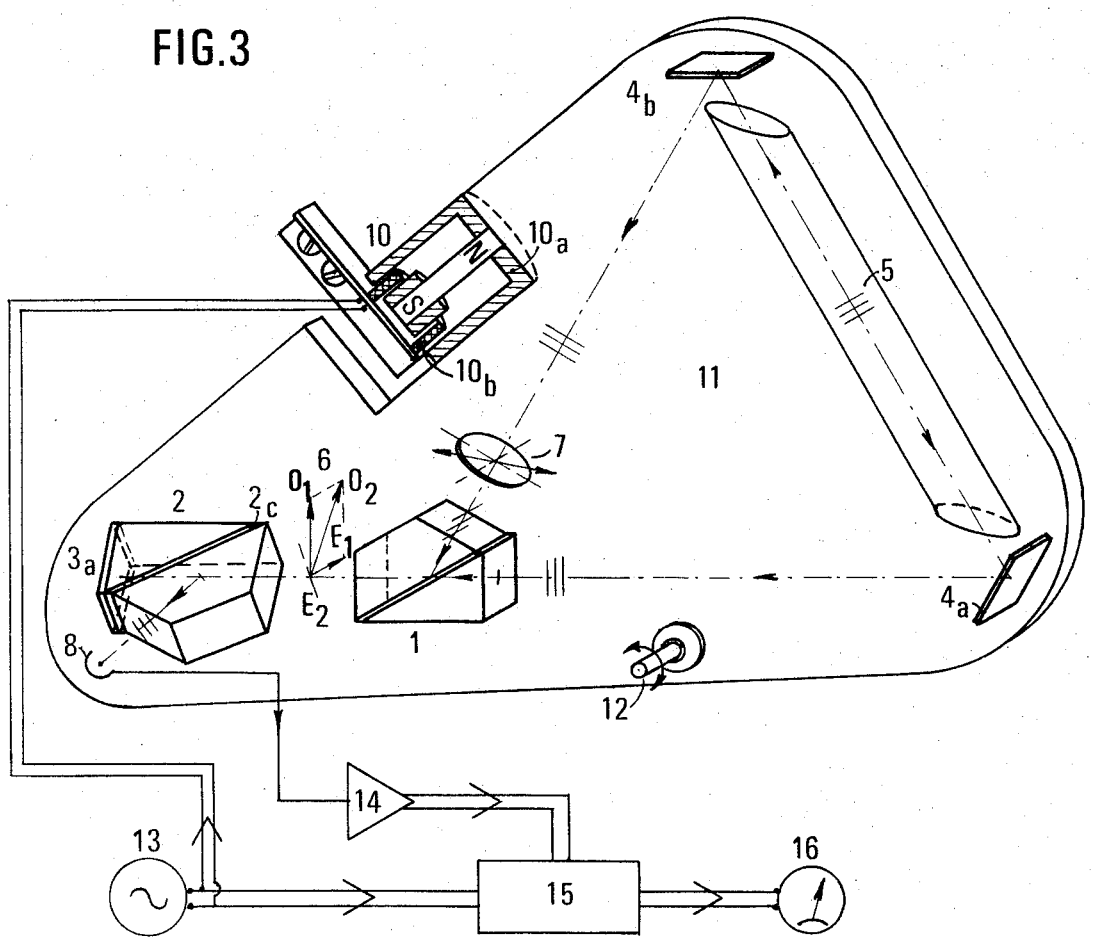
FIG. 3 shows a modified form of the rotation sensitive retarder system embodying the invention equipped with a mechanical modulator and the gas laser discharge tube inside the optical loop.

Otherwise the R.S.R. system of FIG. 3 operates in the same way as that of FIG. 2 without the mirror 3b. The loop in FIG. 3 is formed by the two corner mirrors 4a and 4b and the beamsplitter 1. The exchange of the plane of oscillation is accomplished again in the loop by the half wave plate 7. The combined beam emerging from beamsplitter 1 is transmitted through beamsplitter 2 and reflected by the endmirror 3a. The planes of oscillation are shown again by the vector diagram 6 and by the bars across the light beam.

The beamsplitter 2 reflects internally at the thin plate 2c any signal produced by an angular rate $\omega_0$ in the direction of photosensor 8. The photocurrent is amplified by the preamplifier 14, rectified in rectifier 15 and indicated again by the instrument 16. Power is supplied by the alternator 13 to the rectifier 15 and the mechanical modulator 10.

By removing the mirror 3b from the optical circuit of FIG. 2 or by placing the discharge tube 5 inside the loop as in FIG. 3 the R.S.R. system has become a ring laser similar to well known conventional beat frequency ring laser. But essential differences exist.

Figure 5:
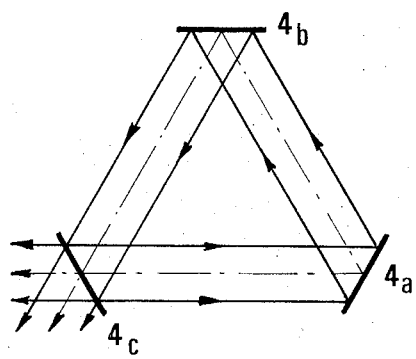
FIG. 5 is a diagram of the loop of the conventional beat frequency ring laser.

If we follow the lightbeam in FIG. 5 which shows the optical circuit of the conventional beat frequency ring laser, we find that the light path in the triangular loop with the cannemirrerr 4a, 4b and 4c is closed after two light circulations, except for the middle beam.

Figure 6:
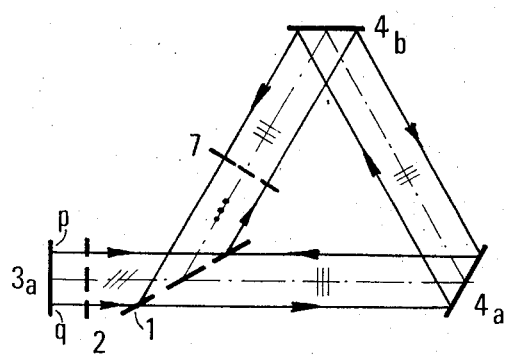
FIG. 6 is a diagram of a simplified optical circuit of the rotation sensitive retarder equipped with a triangular loop.

In the R.S.R. laser system, the simplified optical circuit of which is shown again in FIG. 6, where the beamsplitter 1 and 2 and the half wave plate 7 are indicated by dashed lines, the situation is different. The light path is not closed. It begins and ends at the endmirror 3a. The cavity of the R.S.R. laser system is similar to that of the straight, common laser which is equipped with two endmirrors. The R.S.R. laser system is equipped only with the optical loop which renders feasible the replacement of the two endmirrors by a single one.

Another difference is, that the endmirror 3a of the R.S.R. laser system reflects all the incident light, while the conventional common laser is equipped with one endmirror which is partially transmittant in order to allow some of the light to emerge from the laser.

Consequnetly no light at all can emerge from the R.S.R. laser system of FIG. 2 or 3 as long as the input rate $\omega_0$ remains zero. Always the assumption is made, of course, that the beamsplitter 2 is 100° efficient.

If the R.S.R. laser system is exposed to an angular rate $\omega_0$ the light emerging from beamsplitter 2 increases proportionally with the input rate, as has been explained before.

A further difference between the conventional ring laser and the R.S.R. laser system consists in the character of the emerging signal. The signal of the conventional ring laser fluctuates with a frequency proportional to the input rate $\omega_0$. The intensity fluctuation in the signal of the conventional beat frequency laser is caused by the change in cavity length of the countercirculating light beams, produced by the input rate. The light frequency of the beam circulating in the direction of the input rate decreases, while that of the opposite traveling light component increases. By superimposing, heterodyning, the two opposite traveling light beams, a signal is achieved which fluctuates with a beat frequency, increasing proportionally with the input rate.

On the otherhand the signal emerging from the R.S.R. laser system is basically different. It does not fluctuate. The light frequency of both countercirculating beams remains constant in the R.S.R. laser system despite the change in cavity length by the input rate. The reason for this difference in performance is the beamsplitter 2 which allows only linear polarized light oscillating in the original plane of its $O_2$ ray to be transmitted to the endmirror 3a. All the light oscillating in the orthogonal plane of the extraordinary ray $E_2$ is deflected in beamsplitter 2 and emerges in direction toward photosensor 8. The beamsplitter 2 thus removes automatically any phase angle caused by the input rate $\omega_0$ after every single light circulation around the loop. The effect is the same as if the cavity length of the beam circulating in direction of the input rate were shortend and the length of the countercirculating beam were increased the same amount. Both countercirculating components arrive all the time without any phase shift at the endmirror 3a independent of any input rate to which the system may be exposed.

This action of the beamsplitter 2 has another very important consequence. As pointed out above, the large output signal of the R.S.R. laser system is caused by the multiple circulation of the light around the loop. If we examine, however, the optical circuits of FIG. 2 or 3 closely, the impression arises, that the phase shift brought about in the first light circulation around the loop is canceled in the second one. But this impression is based on the implicit assumption that the countercirculating light components consist of incoherent light. In this case the beamsplitter 1 could not combine the two light components to linear polarized light. The two components $O_1$ and $E_1$ would emerge from beamsplitter 1 separately oscillating independently in orthogonal planes. And they would return to beamsplitter 1, after being reflected at the endmirror 3a, still oscillating in the same orthogonal planes. As a result beamsplitter 1 would guide the returning components on their second trip in opposite directions around the loop than they had traveled on their first trip. This can be realized easily by tracing the rays $O_1$ and $E_1$ in FIG. 2 or FIG. 3. The opposite direction of the phase shift at every second trip around the loop would cancel any phase shift caused by the input rate at the first trip.

In this consideration we have disregarded, of course, some additional facts. With incoherent light the beamsplitter 2 could transmit only half of the incident light to the endmirror 3a. The other half would be deflected internally to the photosensor 8 independently of the existance of any input rate. Beyond that, it would not be feasible to determine any phase shift between the incoherent countercirculating light beams. Under these conditions the R.S.R. system could not work at all.

It has to be realized, therefore, that the light circulating in the R.S.R. system must be coherent to a certain degree. The coherence length has to amount at least to one wave length. Only then can beamsplitter 1 recombine the countercirculating components $O_1$ and $E_1$. Only the combined coherent light can be transmitted through beamsplitter 2 and only the beamsplitter 2 can remove, as discussed, the phase shift caused by the input rate. Since the light returning to the loop after the removal of any phase shift is again linear polarized, as at the beginning and not labeled any more in any way, it does not matter in which direction the photons are traveling around the loop the second time. When an input rate is present, a new phase shift will be produced which is always removed at each return of the light to beamsplitter 2, resulting in a corresponding light intensity input to photosensor 8.

It may be mentioned that it would be feasible easily to exchange the planes of oscillation of the components and thus make them travel always in the same direction around the loop. This could be accomplished by a quarter wave plate inserted between the beamsplitter 1 and 2. But this additional complication is unnecessary.

Summarizing, it can be stated, that the R.S.R. system can operate in two ways. It can function as a R.S.R. laser system or as a system equipped with an independent light source of any type, like an incandescent light located outside the loop. Which solution is preferable depends on the application.

The R.S.R. laser system has the advantage that it is highly accurate in a small size. However, it is more vulnerable to environmental noise, like shock or vibrations, because the number of wave lengths in the cavity of the laser must always be an exact integer fraction of the optical path length.

The R.S.R. system equipped with an independent light source is not so critical in this respect. As long as the light can travel around the loop and back to beamsplitter 2, changes in the path length of the light will not affect to a great degree the performance or cause null drift. This advantage of the R.S.R. system with an independent light source is achieved with the penalty of requiring a large enclosed loop area to achieve accuracy.

PROBLEM AREAS

Certain conditions have to be satisfied, however, to arrive at an accurate and stable R.S.R. system. This holds true particularly with respect to the R.S.R. laser. In order to sustain light oscillation two conditions have to be met by any laser.

First, as mentioned above, the number of wave lengths in the laser cavity must be an exact integer fraction of the optical path length. The wave length of the light is defined by the stationary state, called the levels, of the atomic system of which the amplifier medium consists. Each atomic system has specific energy values. Whenever there is an emission or absorbtion of energy from or into such an atomic system, there is an transition of energy between the levels. The wave length of the emitted light energy is determined by the specific energy value of these levels and by quantum numbers. If the amplifier medium is helium-neon, the standard choice with ring lasers, the system lases at 6,328 A.

A second condition requires that the gain in the amplifying medium must be large enough to cover the light losses in the cavity. This second condition is quite in line with the requirement to achieve a high output accuracy by the multiple circulation of the light around the loop. Therefore, the smaller the light losses, the higher the accuracy and ultimately the smaller the discharge tube.

But with the ring laser additional stipulations exist. As stated, the accuracy of the conventional ring laser is limited by two factors, lock-in and null drift.

Fortunately in the R.S.R. laser, the problem of lock-in does not exist at all. As explained, the frequency of the countercirculating light in the optical loop remains constant. Two different frequencies between which the lock-in would occur do not exist. As a consequence, the R.S.R. laser system is most accurate at small input rates where high accuracy is of particular importance. The accuracy at small input rates is even enhanced by the fact, that the light loss caused by the signal energy escaping from beamsplitter 2 is zero at zero input rate.

With respect to null drift caused by gas flow in the discharge tube the situation is different. Null drift can appear if the discharge tube is placed inside the loop as in the R.S.R. laser system of FIG. 3. In this case gas flow in the discharge tube 5 can cause a difference in the path length of the two countercirculating light components and result in a null drift of the output signal. The path length of the light component traveling in the direction of the gas flow is increased and that traveling opposite to the gas flow is decreased. The margin of the null drift in the R.S.R. laser system is in the same order as that in the conventional beat frequency laser.

This null drift in the R.S.R. laser system can be prevented with the same methods developed for the conventional beat frequency ring laser. Different devices have been worked out there, like two geometrically symmetric discharge tubes supplied with continuous current and special compensation methods, to overcome this problem. But the same situation as with the compensation of lock-in prevails. Certain residual errors remain because the original error to be compensated for is too large. Even if the discharge tube is supplied with high frequency instead of direct current, a certain mean value of the gas flow, which is never zero, exists.

Another method to avoid gas flow in the R.S.R. laser system is the application of a pulsed solid state laser in place of a gas laser. If the pulse frequency is high enough in comparison with the modulation frequency, a solid state laser in the R.S.R. system is quite feasible because the R.S.R. laser system does not require the stability necessary in the ring laser with beat frequency output. With the solid state laser extremely high levels of light intensity in the loop can be obtained which would result in a particularly large output signal at small input rates.

It is not necessary that the light when emerging from the source be already linear polarized, as is the case with the gas laser, equipped with Brewster windows. The polarizing beamsplitters of the R.S.R. system polarize the light automatically.

But with the R.S.R. laser system, another more simple way exists by which null drift caused by the Fizeau effect can be prevented entirely. For this purpose, the discharge tube 5 is placed simply outside the loop as in the system of FIG. 2.

The reason for the absolute prevention of null drift caused by gas flow as a result of this relocation of the discharge tube 5 may be explained as follows. In the discharge tube placed outside the loop the two components $E_1$ and $O_1$ are combined in one beam traveling on an identical path in the same direction in the gain medium, in contrast to the situation prevailing if the discharge tube is placed in the loop where the two components travel in opposite directions. Because of the same direction of the components $E_1$ and $O_1$ a gas flow in the gain medium can not produce any path difference between them. The path lengths of both components increase or decrease the same amount all the time and the difference remains always zero. Under these circumstances any null drift by gas flow in the gain medium is prevented from the outset.

It is clear, that null drift cause by other sources like strain if a solid state laser is applied can be prevented in the same way by placing the gain medium between the endmirror of the resonance cavity and the second beamsplitter.

Figure 7:
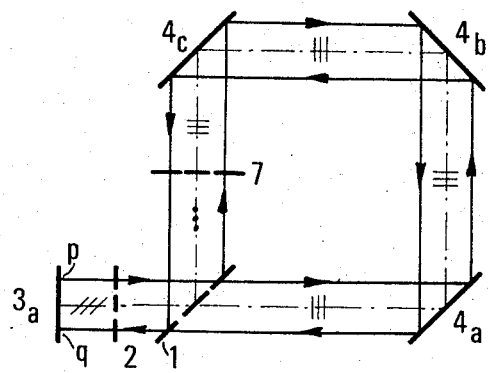
FIG. 7 is a diagram of the simplified optical circuit of the rotation sensitive retarder equipped with a square loop.

But other sources of null drift may be present. In order to illustrate this, a simplified optical circuit of the R.S.R. system with a square loop is shown in FIG. 7. If we trace in this circuit the rays, starting at point p on the endmirror 3a, through beamsplitter 1, around the loop and back to point q, we find that the light component circulating clockwise around the loop travels on a different path than the opposite circulating component. In the square loop the light paths of the two opposite traveling components, exept for the middle beam, are not identical. If we realize, that the ring laser must measure path differences of less than $10^{-6}$ A, it is clear, that this is feasible only if the paths of the two opposite traveling beams are identical. Otherwise changes in the mirrors or air turbulence etc. may cause null drift of the output signal.

If we investigate the triangular loop in FIG. 6 we find, that there, in contrast to the square loop, the opposite traveling components are traveling the same identical path. The triangular loop equipped with an even number of mirrors, if the reflection in beamsplitter 1 is disregarded, is not afflicted with this error. It can be stated, therefore, that a loop equipped with an even number of mirrors, is superior in accuracy and null stability to a loop equipped with an odd number of mirrors, whereby the reflection in the beamsplitter of the loop is not counted.

The detrimental effect, of an odd number of mirrors becomes more obvious if the discharge tube 5 in the R.S.R. laser system is placed inside the loop, for instance between the mirrors 4b and 4c in FIG. 7. In this case, the beamsplitter 1 must combine into linear or elliptical polarized light two light components which are emanating from two laterally separated points in the discharge tube. This would require a very large lateral coherence of the light which probably does not exist. Null drift or complete failure would result in this case.

It can be stated therefore in general, loop configurations equipped with an odd number of loop mirrors should be avoided.

MODULATION

Up to this point the only question of concern was how to achieve a signal as large as possible at small input rates. Equally important with respect to the final accuracy is the question of how the polarization-form conversion can be analysed most effectively.

In the R.S.R. system discussed in the aforementioned application Ser. No. 41,849 a conventional polarization-form analyzer was employed. But in the R.S.R. system equipped with the 100 percent effective beamsplitter 2, as in FIG. 2 and FIG. 3, conventional analyzing methods are not applicable. The $E_2$ ray emerging from the efficient beamsplitter 2 varies from zero light intensity to some intensity proportional to the square of the input rate and is linear polarized all the time, oscillating in the same plane. Under these circumstances the conventional analyzing method is not able to determine the polarization-form cerversion produced by the input rate.

In addition the light arriving at the photosensor 8 is not modulated. The light level remains constant when the input rate $\omega_0$ is constant and a proper modulation is no longer feasible. As a result, a direct current is generated in photosensor 8 when the system is exposed to a constant input rate, which is difficult to amplify and large errors may arise from foreign stray light. Worst of all, the direct photo current $i_p$ which according to equation 7 is proportional to $\omega_0^2$ always flows in the same direction, independent of the direction of the input rate Thence the direction of the input rate is lost in the output signal.

In order to modulate the $E_2$ emerging from the 100 percent efficient beamsplitter 2, the polarization-form of the light must be modulated before it is incident in beamsplitter 2. This modulation can be accomplished, by modifying periodically the path difference of the opposite traveling light components in the optical loop. A difference in path length of these two components can be produced in different ways, either mechanically or electrically.

The simplest method consists in mechanical dithering. For this purpose the entire optical part of the R.S.R. system is exposed to an angular vibration. FIG. 3 illustrates such a dithering arrangement. The optical circuit of the R.S.R. system is installed on the frame 11 which has a small angular freedom around pivot 2. The vibration is produced by the vibrator 10 which in this case is nothing but a conventional forcer of a normal loudspeaker system. The forcer consists of the soft iron pot 10a in the center of which the cylindrical permanent magnet N-S is installed. The coil 10b can move in the air gap between the pot and the permanent magnet. By supplying alternating current from the alternator 13, the coil 10b will move the pot 10a periodically up and down and thus vibrate the frame 11. The frequency of vibration can be in the order of 20 to 50 Hz.

Many other methods to obtain dithering, utilizing piezo-electrical or other effects have been developed which could be applied here as well. The amplitude of the dithering angle can be kept very small, less than a second of arc. Hence the distance at which the coil 10b has to move in the air gap of the magnetic pot 10a is in the order of microns. The stability requirement of dithering in the R.S.R. system with respect to amplitude and frequency is not critical, quite in contrast to the conventional beatfrequency laser gyro where dithering is used often as a means to overcome lock-in.

A method of electrical modulation is illustrated in connection with the optical circuit in FIG. 2 where the Faraday cell 9 is utilized. The Faraday cell 9 consists of the glass body 9a which is surrounded by the coil 9b producing a magnetic field in the glass body 9a parallel to the light beam direction. The light traveling through the glass body 9a is elliptically polarized. Only elliptical and not circular polarization is required in this case because of the small path differences involved. The elliptical polarization is produced by the quarter wave plates 9c and 9d on either side of the glass body 9a. The optic axes of the quarter wave plates, indicated by the double headed arrows, are rotated at a small angle with respect to the plane of oscillation of the linear polarized rays in the loop. The arrows formed like an ellipse between the glass body 9a and the quarter wave plates 9c and 9d indicate the handedness of the elliptical polarization of the opposite traveling components.

The coil 9b of the Faraday cell is supplied with alternating current by the alternator 13. The alternating current induces an alternating magnetic field along the lightbeam axis in the glass body 9a. Because of the Faraday effect the glass body 9a becomes optically active and the path length of the lightbeam traveling in the one direction is increased and that travelling in the opposite direction is decreased. When the direction of the magnetic field is reversed, the change in path length of the oppositly traveling beams is inversed as well. Hence, the path length of each of the countercirculating rays and the path difference fluctuate with the frequency of the supplied alternating current. This causes an alternating phase angle $\delta_M$ between the two rays in exactly the same way as the mechanical dithering.

The principle of the modulation caused by dithering or by electrical means is illustrated in the diagrams of the FIGS. 8a – 8f, in which the input rates $\omega_0$, the modulation rate $\omega_M$ and the photocurrent $i_p$ are plotted as the function of the time $t$. For the sake of simplicity the assumption has been made in the diagram that the dithering movement $\omega_M$ or the corresponding current in the coil of the Faraday cell are square shaped. Actualy they are sinusoidal. Wether square shaped or sinusoidal, the end result will be the same, except that with the square wave a second harmonic is produced which, however, is automatically filtered out from the photocurrent by the following amplifier circuit. Therefore, the second harmonic can be ignored in these considerations from the very beginning.

The diagram 8a shows the modulation rate $\omega_M$ produced by dithering or by the Faraday cell as a function of the time $t$. The resulting photocurrent $i_p$ is plotted in the diagram 8b. In both diagrams, 8a and 8b, the assumption has been made, that the input rate $\omega_0$ is zero.

Figure 8:
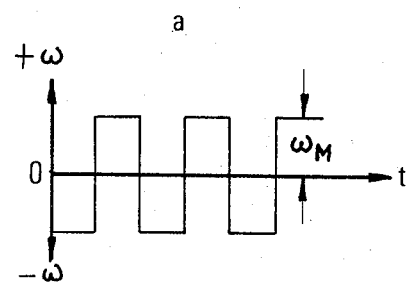
FIG. 8, a-f are time diagrams illustrating the operation of the modulator.
Figure 8:
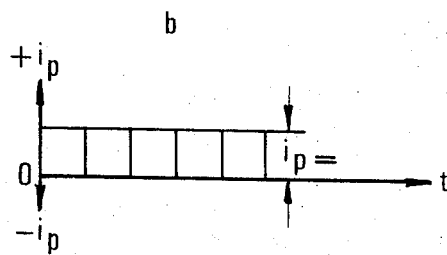
Figure 8:
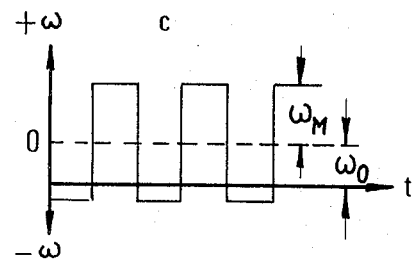
Figure 8:
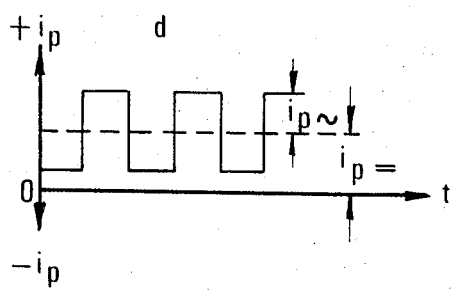
Figure 8:
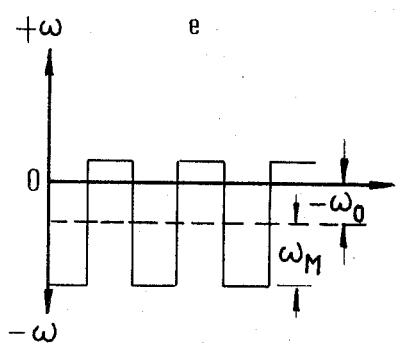
Figure 8:
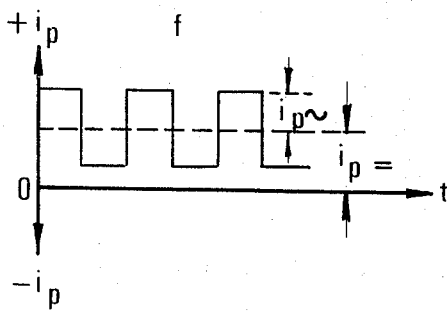

In spite of the alternating modulation rate $\omega_M$ the resulting photocurrent $i_p$ is a direct current of constant amplitude (FIG. 8b). This is so because the light intensity to which the photosensor reacts is proportional to the square of the amplitude of the light, as discussed above and as expressed by equation 7.

When the R.S.R. laser system is exposed additionally to a constant input rate $\omega_0$, superimposed on the modulation rate $\omega_M$, the photocurrent $i_p$ generated in the photosensor 8 fluctuates. An alternating current $i_{p\sim}$ oscillating with the modulation frequency, is superimposed on the direct current $i_{p=}$. The amplitude of the alternating current $i_p$ increases proportional with the input rate $\omega_0$.

This is illustrated in the diagrams of FIG. 8c and 8d. When $\omega_M$ is positive it adds up with $\omega_0$ to the total input rate $\omega_0+\omega_M$. When $\omega_M$ is negative the total input rate is $\omega_0-\omega_M$. As a result the photocurrent $i_p$ (FIG. 8d) will fluctuate between the value $i_{p_{max}}=K_0(\omega_0+\omega_M)^2$ and $i_{p_{min}}=K_0(\omega_0-\omega_M)^2$, where $k_0$ is a constant. As can be seen easily with simple mathematics, an alternating photocurrent $i_{p\sim} = 4\ k_0\ \omega_M\omega_0$, which is proportional to the difference of the two values above is superimposed on a direct current $i_{p=}$.

If the input rate $\omega_0$ is negative, as illustrated in FIG. 8e, a superimposed alternating photocurrent $i_p\sim$ of the same amplitude as before is generated in the photosensor 8. If this photocurrent (FIG. 8f) is compared with the photocurrent caused by the positive input rate $\omega_0$, of the same size, illustrated in FIG. 8d, we see that it is shifted 180° in phase.

The alternating photocurrent $i_p\sim$ is amplified in the AC amplifier 14 which amplifies only alternating current (FIG. 2 and 3). As a result the direct current component is automatically discarded. In rectifier 15 the alternating current from amplifier 14 is phasesensitive rectified and a direct current the size and direction of which is proportional to the input rate $\omega_0$, is supplied to the indicating instrument 16.

The analyzing arrangement disclosed above which is designed specially for the R.S.R. system is simple and most accurate. The reflecting polarizer 2 serves simultaneously as beamsplitter and analyzer. Hence, the arrangement embodying the invention requires fewer parts than the analyzing arrangement shown with the R.S.R. system of the aforementioned patent application. This results at the same time in a less complicated installation and calibration. The modulation frequency and amplitude need not be very constant as mentioned already. Slow diviations from normal do not cause errors or null drift. The higher accuracy of the analyzing arrangement is obtained, because only the signal light is deflected in beamsplitter 2 to the photosensor and all the rest of the original light is retained and recycled around the loop.

REBALANCE

A prerequisite for achieving effective multiple light circulation and a resulting large output signal at small input rates is a reduction in light losses. The light losses of the R.S.R. system are the smaller the smaller the input rates, as has been shown. Because of the release of more light energy the accuracy falls off with increasing input rate. One way, therefore, to keep the light loss small consists in holding the effective input rate small.

The effective input rate can be kept very small all the time by employing rebalance or negative feedback. Negative feedback is specially compatible with the R.S.R. system because of its intrinsic pecularity to operate best at small input rates.

Figure 9:
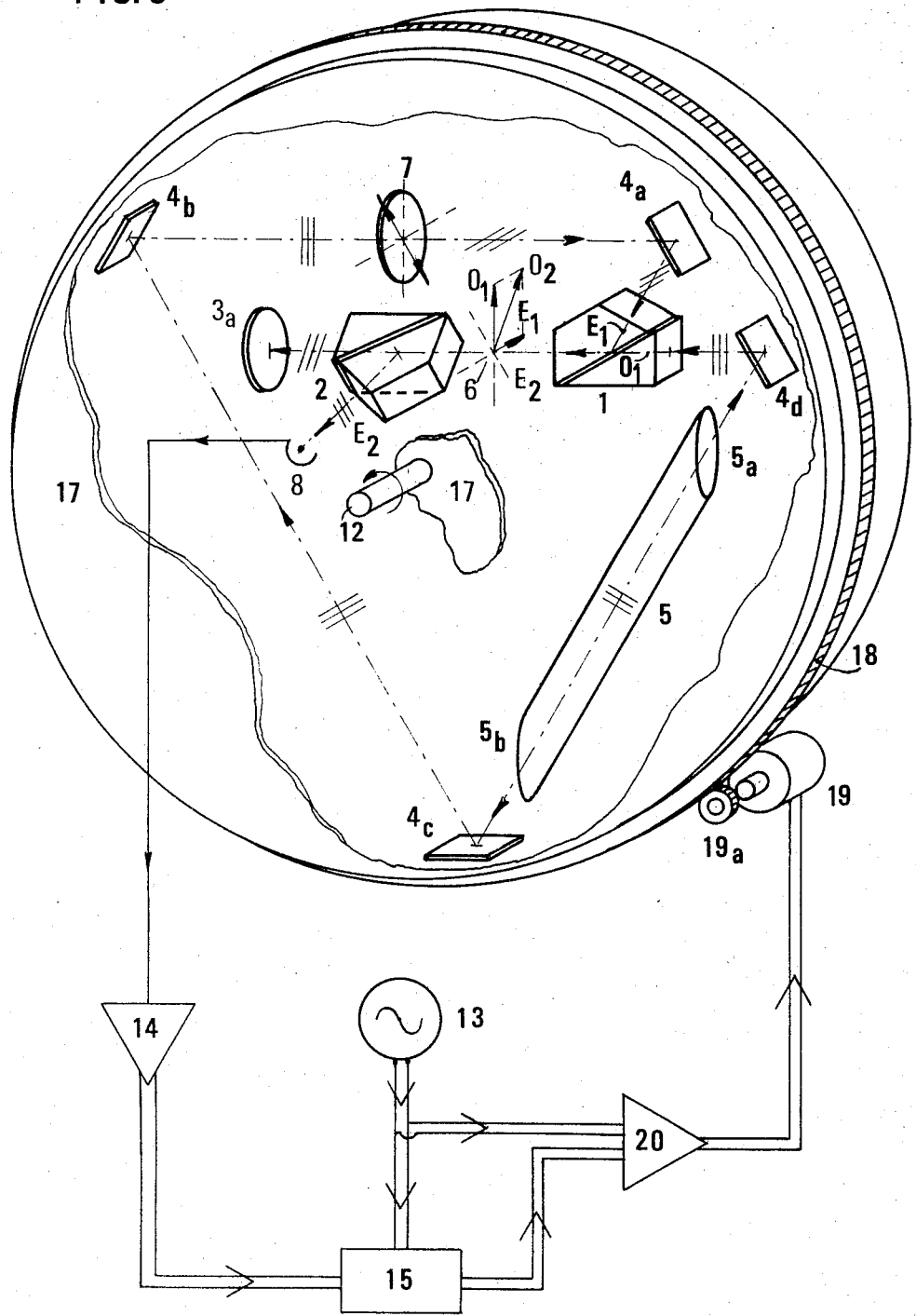
FIG. 9 is a diagram of a further modified form of the rotation sensitive retarder system equipped with mechanical modulation and mechanical feedback.

Negative feedback is feasible in the R.S.R. system in a mechanical or electrical way. In FIG. 9 a R.S.R. system, employing mechanical feedback is shown. Modulation is obtained by dithering. The R.S.R. system of FIG. 9 delivers at once the drift angle which is the integral of the input rate $\omega_0$. It does not require an extra integrator. In this way the drift angle which is of primary interest in many applications of the R.S.R. system is obtained with superb accuracy. In addition, many error sources are avoided from the very beginning, not only those connected with the integration process as such but also the light losses caused by additional optical elements otherwise necessary in the optical loop for purposes like modulation.

The optical circuit in FIG. 9 is similar to that of FIG. 3. The optical loop is equipped with corner mirrors 4a, 4b, 4c and 4d and the beamsplitter 1. The beamsplitter 2 deflects the signal light $E_2$ to the photosensor 8. The endmirror 3a reflects the light transmitted through beamsplitter 2 back to the loop. The light energy is supplied by the discharge tube 5 placed between the loop mirrors 4c and 4d. The half wave plate 7 exchanges, as before, the planes of oscillation of the oppositely traveling light components in the loop. The planes of oscillation are indicated again by the three cross bars and by the diagram 6 between beamsplitter 1 and 2.

The optical circuit of the R.S.R. system is installed in a drum 17, which can rotate around a pivot 12. The drum 17 which is shown in part section in FIG. 9 to show the optical circuit installed in it, is equipped with a gear ring 18 which is meshed with a pinion 19a of a servo motor 19.

The motor 19 has two functions. It acts as a servo, turning the drum 17 always opposite to the input rate $\omega_0$ to which the total R.S.R. system is exposed in inertial space. The angular rate affecting the optical part installed in the drum 17 is reduced this way to zero. At the same time the motor 19 produces the dithering.

To cause dithering the motor 19 is connected via the servo amplifier 20 with the alternator 13. In this way motor 19 vibrates with the frequency of the current supplied by the alternator 13.

To keep the rate of the drum 17 around the pivot 12 to zero, the motor 19 is controlled by the photosensor 8 via the preamplifier 14, the phasesensitive rectifier 15 and the servo amplifier 20. In this way the motor 19 acts like a servo motor which tries to reduce the photocurrent $i_p \sim$, together with the angular rate of the drum 17 around pivot 12, always to zero.

The arrangement of FIG. 9 is extremely accurate. The maximum photocurrent and with it the phase shift between the oppositely traveling light components in the loop remain all the time very small. As a result, also the dithering amplitude can be kept very small. The system supplies immediately the drift angle which can be ascertained directly from the gear ring 18. Since no additional integrator is involved all the errors inherent in the integration process are avoided.

The rebalance arrangement of FIG. 9 resembles in a way the one gyro platform equipped with a flywheel gyro, except it is simpler in design and has no fast rotating masses. In addition the R.S.R. system is superior because of the noneexistance of the large torques arising in the flywheel gyro platform from rotations about the axes perpendicular to the measuring axis. Because these torques have to be compensated for with the flywheel gyro, also other components and the entire platform design have to be stronger.

It is feasible, of course, to equip a two or three gyro platform with R.S.R. systems and the increased accuracy is achieved as well.

Figure 10:
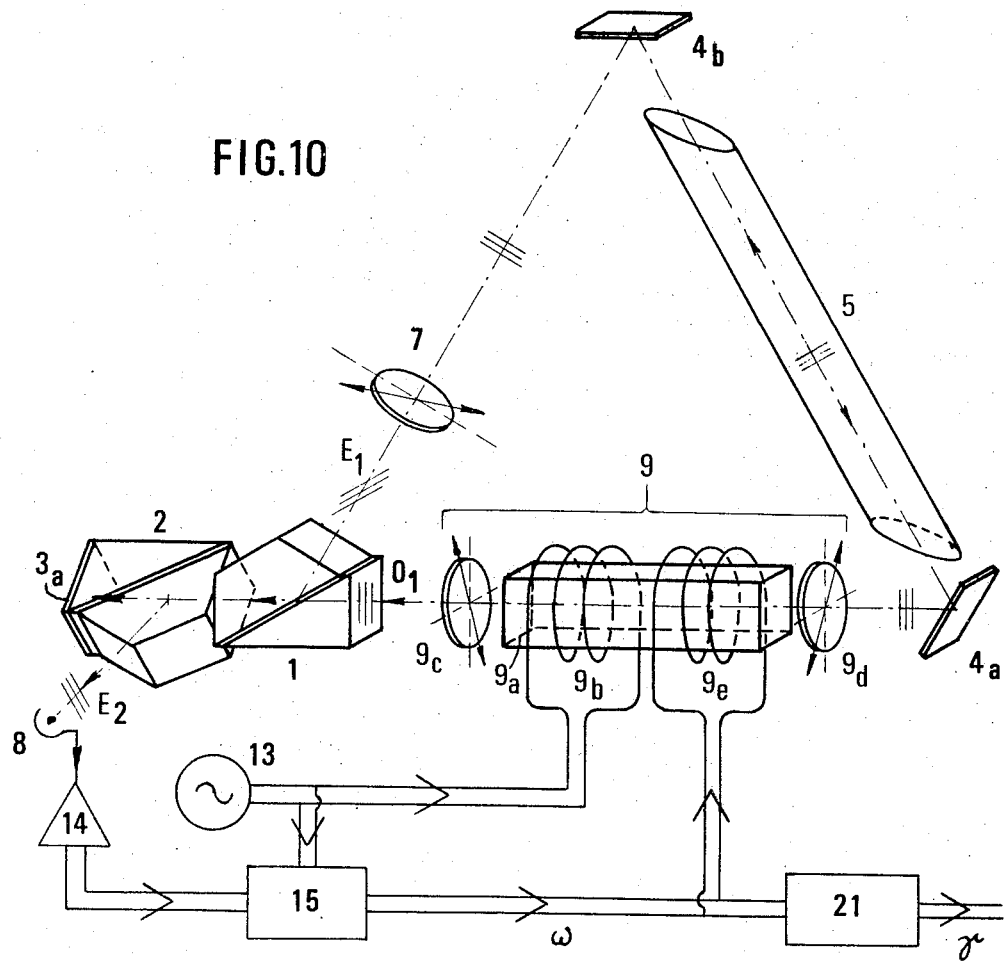
FIG. 10 is a diagram of a rotation sensitive retarder system with electrical feedback.

An electrical feedback arrangement is illustrated in FIG. 10. The optical circuit of this arrangement is similar to that of FIG. 2 and 3. Since the optical elements in FIG. 10 are marked with the same numbers as in the optical circuits shown before, a detailed description of the optical circuit of FIG. 10 is not necessary. The system in FIG. 10 differs from that of FIG. 2 only in the Faraday cell 9 which is equipped with two coils, the coil 9b for modulation and a compensating coil 9e for the electrical feedback. The modulation coil 9b is supplied with alternating current by the alternator 13 as in FIG. 2. The compensating coil 9e is supplied with the feedback current controlled by the photosensor 8 via the preamplifier 14 and the rectifier 15. The magnetic field excited by the current in coil 9e compensates for the phase shift $\delta$ produced by the input rate $\omega_0$ and thus reduces again the photocurrent $i_p \sim$ to zero.

The electrically compensated R.S.R. system has the advantage over the mechanically compensated system in that it does not contain mechanical moving parts. It has the disadvantage that it is less accurate. An additional integrator 21 is required in the electrical system to determine the drift angle $\gamma$. The compensating current, the time integral of which is the drift angle, should be linear over a wide range. This is only true to some degree, because of the characteristics of the Faraday cell. All the linearity errors and others are multiplied with time in the integration process.

Figure 12:
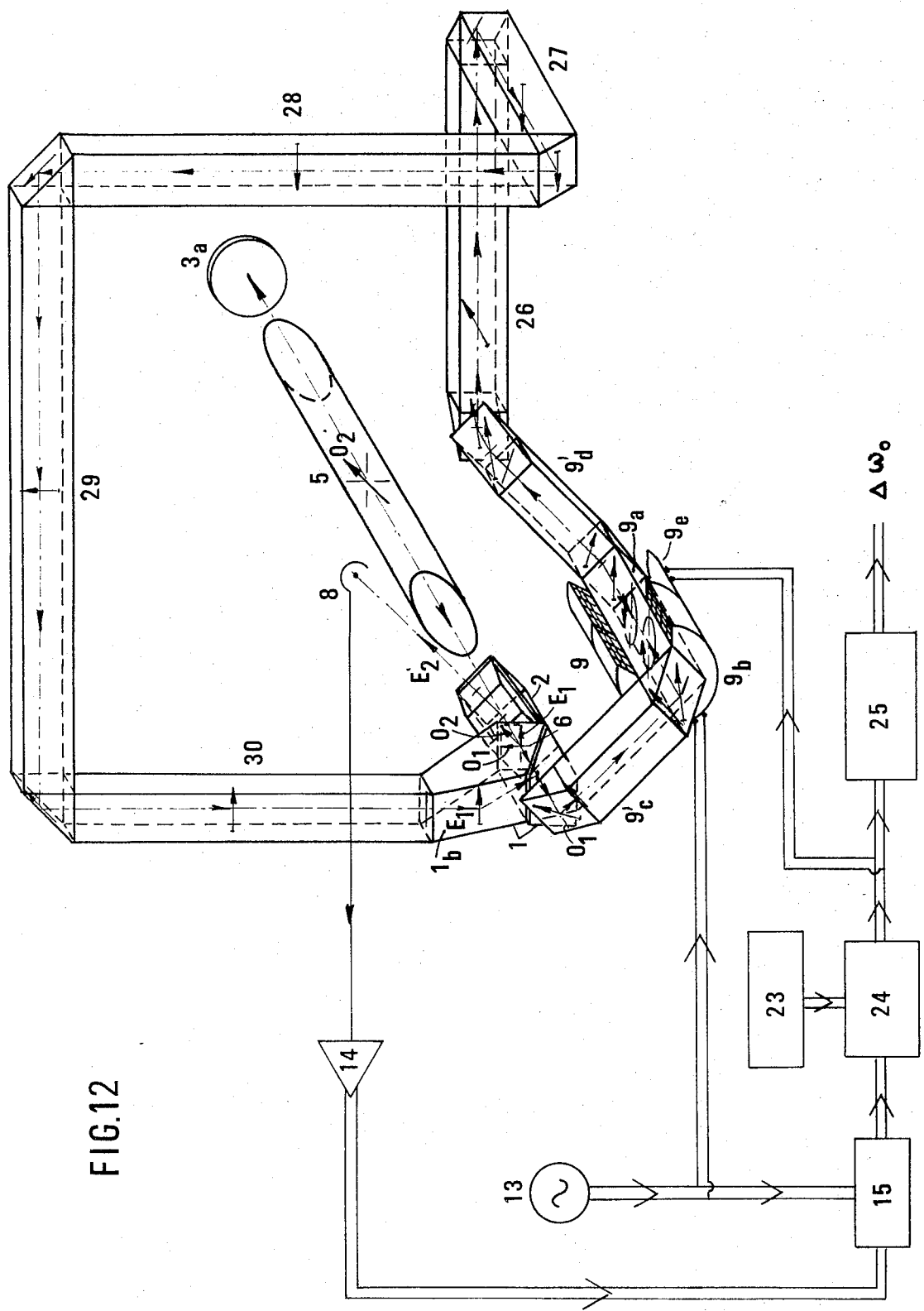
FIG. 12 is a diagram of the rotation sensitive retarder system equipped with pulsed feedback.

The accuracy of the integration can be improved by digitizing, instead of amploying an analog compensating current. The digital output arrangement is illustrated in FIG. 12 where the compensating coil 9e of the Faraday cell 9 is supplied with a train of pulses.

The current pulses have constant amplitude, constant width and constant frequency. They are generated in the pulse generator 23. The polarity of the pulses is controlled in the rebalance circuitry 24 by the output current of rectifier 15. The continuous output current of rectifier 15 is controlled, as in the circuits discussed before, by the photosensor 8, and this way the polarity of the pulses, is a function of the angular rate $\omega_0$ to which the system is exposed.

If the angular rate $\omega_0$ is zero, alternate positive and negative pulses are received by the coil 9e. If an angular rate exists the output of rectifier 15 will gate the output of the pulse rebalance circuitry 24 which supplies the coil 9e so as to change the polarity of the compensating pulse current sufficiently to balance any phase angle $\delta$ between the opposite traveling light components in the loop produced by the angular rate $\omega_0$.

The rate increment circuitry 25 outside the pulsed compensation loop provides an output pulse $\Delta\omega_0$ whenever an inverted current pulse appears at coil 9e. The output rate of pulses then is proportional to the input rate $\omega_0$ whereby each pulse represents an increment $\Delta\omega_0$ of the angular rate $\omega_0$. The number of pulses which can be readily accumulated in a digital computer, is the integral of $\omega_0$ and represents the drift angle $\gamma$.

The size of the compensating pulses need not exceed the sensitivity threshold of the R.S.R. system by very much. As a result the released light energy remains very small at the time. The pulse and the modulation frequency can be the same or different.

If the input rate $\omega_0$ is zero only a direct photocurrent $i_p =$ is produced by the alternate positive and negative pulses. The same situation prevails as with the modulation pulses shown in FIG. 8a and 8b.

Many modifications of the digital rebalance circuit are feasible. The modulation current and the pulse current could be superimposed electrically and the combined current fed into one single coil of the Faraday cell or rebalance pulses could be used at the same time for modulation. It would be feasible also to combine dithering with digital compensation, etc. Finally a large variety of rebalance circuits used in other fields like pulsed rebalance accelerometers could be applied.

Though the accuracy obtainable with digital rebalance is better, than with analog feedback, mechanical rebalance as shown in FIG. 9 is superior. Errors can be caused by changes in the optical properties of the glass body of the Faraday cell due to strain, temperature and so on.

Light Loss in Loop

The released signal energy is but one source for light loss. Much light is lost in the loop by partial reflection at the surface of optical elements, like the half or quarter wave plates, the beamsplitter and some in the reflection process at the mirrors. These losses can be reduced by different methods like coating.

Another way to avoid these losses is illustrated in FIG. 12 where the light travels on its way around the loop always in a medium of constant optical density. The deflection at the corners of the loop is accomplished by total internal reflection and the exchange of the planes of oscillation by geometrical means.

Figure 11:
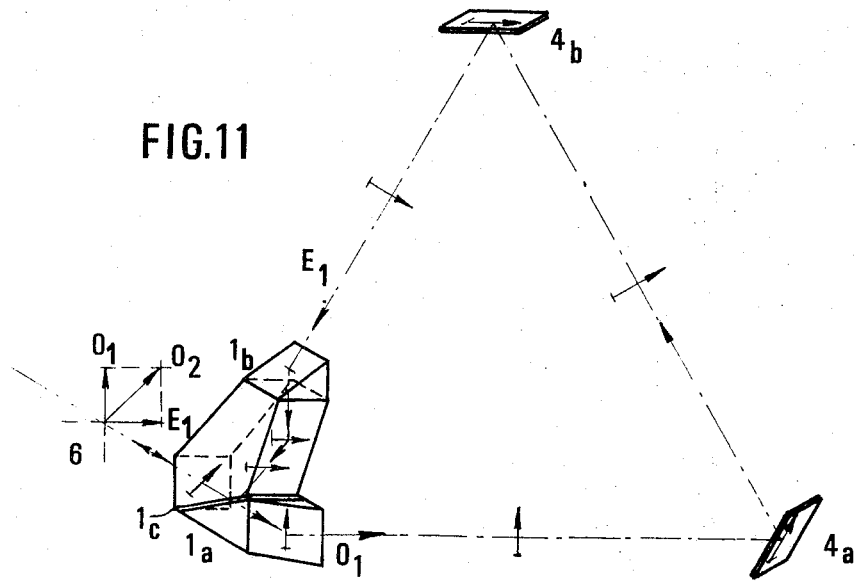
FIG. 11 is a diagram of an optical loop of the rotation sensitive retarder system whereby the exchange of the planes of oscillation is obtained by geometrical means instead with an extra half wave plate.

In FIG. 11, there is shown an optical loop wherein the exchange of the planes of oscillation of the countercirculating beams can be achieved without a half wave plate. The loop is triangular and comprises beamsplitter 1 and corner mirrors $4a$ and $4b$. The other optical elements, like the analyzing beamsplitter, the light source and the modulator, are omitted.

The beamsplitter 1 consists, as before, of the two glass prisms $1a$ and $1b$, separated by the birefringent plate $1c$. The prism $1b$ is modified such, that the incident face of the $E_1$ ray is slanted at the Brewster angle. This way partial reflection and light loss is prevented. At the same time the $E_t$ ray is deflected at an angle as shown in FIG. 11.

The manner in which the exchange of the planes of oscillation of the countercirculating beams is achieved by the geometrical arrangement can be realized best by tracing the rays around the loop. The planes of oscillation at different points is indicated in FIG. 11 by small arrows, light vectors, across the beam direction. If we start at the vector diagram 6 with the light vector of the ray $O_1$ and follow the $O_1$ ray around the loop, we find that the plane of oscillation is rotated at an angle of 90° when the light is incident on the $E_1$ face of prism $1b$. The returning light of the $O_1$ ray will oscillate in the plane of the $E_1$ ray when it arrives at the starting point 6

The same result is achieved if the $E_1$ ray is traced in opposite direction. The $E_1$ ray returns to the starting point 6 is the plane of the $O_1$ ray.

In the optical circuit of FIG. 11, light loss by partial reflection may still occur at the incidence face $O_1$ of the prism $1_a$ and small additional losses may occur at the surfaces of the mirrors $4a$ and $4b$. In the loop equipped with the Faraday cell, which has many partially reflecting surfaces, as can be realized from FIG. 10 more light losses arise.

The optical circuit of FIG. 12 illustrates the manner in which such losses by partial reflection can be avoided by having the light travel in its path around the loop always in a medium of equal optical density. In this case also the Faraday cell 9 can be incorporated, but the quarter wave plates have to be replaced by Fresnel rhombs.

In FIG. 12 the discharge tube 5 is placed outside the loop between the endmirrors $3a$ and the analyzing beamsplitter 2. The beamsplitter 2 and the loop beamsplitter 1 are cemented together. The loop as such is composed of cemented glass prisms of the same refractive index, $n_G=n_0$. This way partial reflection in the loop does not exist. The light is guided around the corners of the loop by total internal reflection which does not cause light loss.

The exchange of the planes of oscillation can be realized best by ray tracing. If we follow the $O_1$ ray, starting at the vector diagram 6 through prism 1 and the Faraday cell 9, the glass prisms 25 to 30, we find the light arriving at prism $1b$ of beamsplitter 1 is oscillating in the plane of the $E_1$ ray. The plane of oscillation is marked again at different points, in particular at the inner reflecting surfaces of the prisms, by small vectors across the light beam direction.

The Faraday cell 9 which is equipped with the Fresnel rhomb $9c'$ and $9d'$ in place of quarter wave plates, functions in the same way as explained before. The Fresnel rhombs convert the linear polarized light in circular polarized light by internal reflection. This happens because the plane of oscillation of the incident linear polarized light is rotated at an angle of 45° with respect to the plane of incidence of the totally reflecting surfaces of the Fresnel rhombs $9c'$ and $9d'$. By the azimuth angle of 45°, the incident linear polarized light is split in two components and a phase difference is produced between them. As a result the light in the glass body $9a$ of the Faraday cell 9 is circular or elliptical polarized as indicated by the elliptically shaped arrows in the glass body $9a$. Because the Fresnel rhomb $9c'$ is rotated by 90° with respect to the rhomb $9d'$, the light emerges from the Faraday cell again linear polarized.

A much simpler loop of equal optical density is feasible, of course, if the modulation is produced by dithering and mechanical feedback is applied.

To avoid partial reflection at the only surface in the optical circuit of FIG. 12, namely the surface which is the incidence face of beamsplitter 2 adjacent to the discharge tube 5, this incidence face can be coated or adjusted such that it is located in a node of the light oscillation or it can be slanted at the Brewster angle.

SUMMARY

The efficient and highly accurate arrangements and methods embodying this invention utilize the principle of the rotation sensitive retarder system (R.S.R.) disclosed in the aforementioned patent application Ser. No. 48,849, in particular the combination of the two polarizing beamsplitters the transmission axes of which are rotated at an angle of 45° to each other.

In this invention the second of the two beamsplitters which is placed in the reunified beam outside the optical loop has a dual purpose. It functions not only as the splitting device but simultaneously as the polarisation-form analyzer. This dual function leads to improved accuracy and to the simplification of the optical circuit because an extra analyzer becomes unnecessary.

However, the invention requires specific methods for the light output modulation. The polarization-form of the reunified light beam returning from the optical loop must be modulated periodically before incident in the second analyzing beamsplitter. In this invention mechanical as well as electrical methods for producing the modulated polarization-form conversion have been disclosed.

The application of the second beamsplitter renders feasible further new improved modifications, which are part of this invention. One of them is the R.S.R. laser utilizing the optical loop as resonance cavity. In contrast to the conventional beatfrequency laser, the R.S.R. laser operates with a constant oscillating frequency irrespective of input rate. As a result a lock-in error can not exist. Beyond that, null drift caused by gas flow in the gain medium can be eliminated completely by placing the discharge tube outside the loop between the cavity end mirror and the second polarizing beamsplitter.

The R.S.R. system is most sensitive at small input rates. Hence it lends itself with advantage to negative feedback arrangements in which the effective input rate is reduced, thus further enhancing the measuring accuracy. Mechanical and electrical negative feedback is feasible. With electrical feedback systems, pulsed, digital feedback rather than analog rebalance is feasible.

Additionally, methods to eliminate error sources are disclosed in this invention. It has been shown, that an even number of reflections in the optical loop is preferable to an odd number in order to prevent null drift, whereby the reflection in the loop beamsplitter is not counted.

Finally methods have been shown by which light losses can be reduced. The half-wave plate which can cause partial reflection may be eliminated by exchanging the planes of oscillation of the countercirculating beams with a geometrical arrangement of the loop mirrors and other sources of partial reflection may be avoided by having the light travel on a path of constant optical density.

In all forms a prerequisite of small light loss is the application of efficient and compatible polarizing beamsplitters, such as those shown and described.

I claim:

1. A rotation sensitive retarder system comprising means for forming a beam of radiant energy,
a first polarizing beamsplitter for splitting said beam into two orthogonal linear polarized components comprising an ordinary ray and an extraordinary ray and for reunifying said components,
a plurality of means defining reflective surfaces positioned in a manner such as to provide an optical loop defining identical closed paths for said components of light in opposite directions,
said first beamsplitter being positioned in said paths, means in said paths for changing the planes of polarization of the emerging othogonal components by 90° for reunification,
a second polarizing beamsplitter positioned exteriorly of said closed paths for transmitting substantially only that part of the reunified light which oscillates in the original plane of zero input rate and directing substantially only the light oscillating in the orthogonal plane due to an input rate externally of the path of the beam and the loop,
the transmission axis of one of said beamsplitters being at 45° to the transmission axis of the other beamsplitter,
means in advance of the second beamsplitter for modulating the polarization form of the reunified light passing to the second beamsplitter.

2. The combination as set forth in claim 1 wherein said modulating means comprises means for modulating the path length in the optical loop.

3. The combination set forth in claim 1 wherein said moudlating means comprises dithering means for angularly vibrating the entire optical circuit about the axis of the system.

4. The combination set forth in claim 1 wherein said modulating means comprises electrical-optical means for modulating the beam.

5. The combination set forth in claim 1 wherein said means for changing the planes of polarization of the emerging orthogonal components comprises reflecting surfaces tilted about orthogonal axes.

6. The combination set forth in claim 1 including a negative feedback means from the output of said second polarizing beamsplitter for compensating for the input rate.

7. The combination set forth in claim 6 wherein said last-mentioned means comprises a servomotor adapted to provide a feedback rotation for the optical system.

8. The combination set forth in claim 6 wherein said negative feedback means comprises electro-optical means for providing a feedback input to the beam.

9. The combination set forth in claim 8 wherein said last-mentioned means comprises a Faraday cell in the optical loop.

10. The combination set forth in claim 8 wherein the feedback current is pulsed to provide a digital output.

11. The combination set forth in claim 1 wherein said means defining said reflective surfaces provide an even number of reflective surfaces in said closed optical path.

12. The combination set forth in claim 1 wherein the major portion of the path of each closed path is through a solid medium of substantially equal optical density and said reflecting surfaces are provided by total internal reflection in such medium.

13. The combination set forth in claim 1 wherein said optical loop is utilized as laser cavity, said second beamsplitter externally directs any light which oscillates in the plane orthogonal to the original zero input rate laser oscillation, whereby the oscillating frequency of the two countercirculating light components in the optical loop is kept constant irrespective of the input rate and the light intensity of the output signal is utilized to determine angular rate, thus eliminating lock-in.

14. The combination set forth in claim 3 wherein said laser comprises a gas laser.

15. The combination set forth in claim 13 wherein said laser comprises a solid state laser.

16. The combination set forth in claim 13 wherein said laser beam forming means comprises an amplifying medium positioned externally of said closed optical path and directing the beam through said second polarizing beamsplitter into said closed optical path.

17. The combination set forth in claim 13 wherein said laser forming means comprises an amplifying medium positioned within the closed optical loop.

18. The combination set forth in claim 13 wherein the laser comprises an amplifying medium and one end reflector, said amplifying medium and said end reflector being located in the combined beam outside the optical loop, the resonance cavity of said laser comprising the path from the end reflector around the optical loop and back in order to eliminate null drift.

19. The combination set forth in claim 13 wherein said modulating means comprises dithering means for angularly vibrating the entire optical circuit about the axis of the system.

20. The combination set forth in claim 13 wherein said modulating means comprises electrical-optical means for modulating the beam.

21. The combination set forth in claim 13 wherein said means for changing the planes of polarization of the emerging orthogonal components comprises reflecting surfaces tilted about orthogonal axes.

22. The combination set forth in claim 13 including a negative feedback means from the output of said second polarizing beamsplitter for compensating for the input rate.

23. The combination set forth in claim 21 wherein said last-mentioned means comprises a servomotor adapted to provide a feedback rotation for the optical system.

24. The combination set forth in claim 21 wherein said negative feedback means comprises electro-optical means for providing a feedback input to the beam.

25. The combination set forth in claim 24 wherein the feedback current is pulsed to provide a digital output.

26. The combination set forth in claim 13 wherein said means defining said reflective surfaces provide an even number of reflective surfaces in said closed optical path.

27. The combination set forth in claim 13 wherein the major portion of the path of each closed path is through a solid medium of substantially equal optical density and said reflecting surfaces are provided by total internal reflection in such medium.

* * * * *